June 9, 1959 N. J. HONICH 2,889,719
VARIABLE SPEED COOLING FAN FOR MOTOR VEHICLES
Filed March 12, 1956 2 Sheets-Sheet 2
FIG.3.
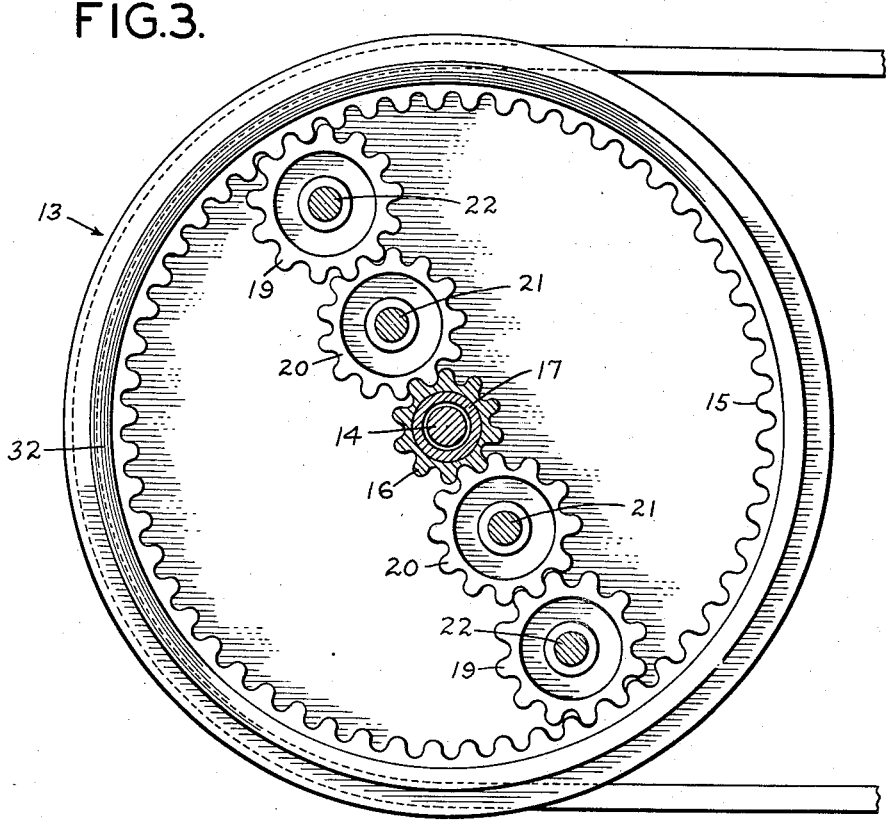
FIG.5.
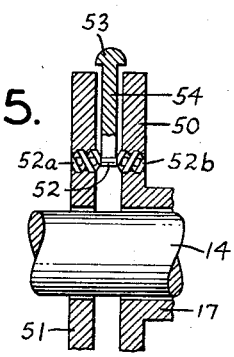
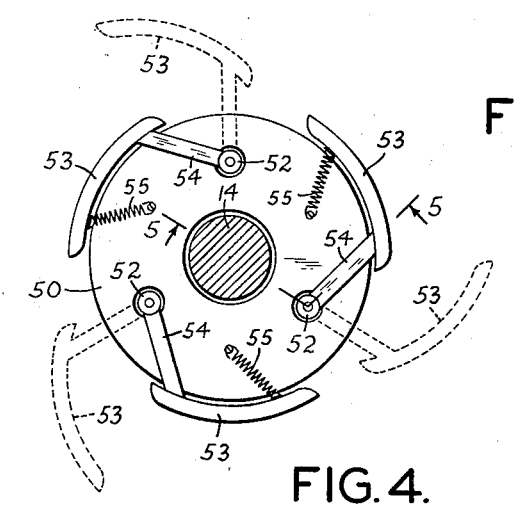
FIG.4.
INVENTOR
NICHOLAS J. HONICH
BY
HIS ATTORNEYS United States Patent Office 2,889,719
Patented June 9, 1959

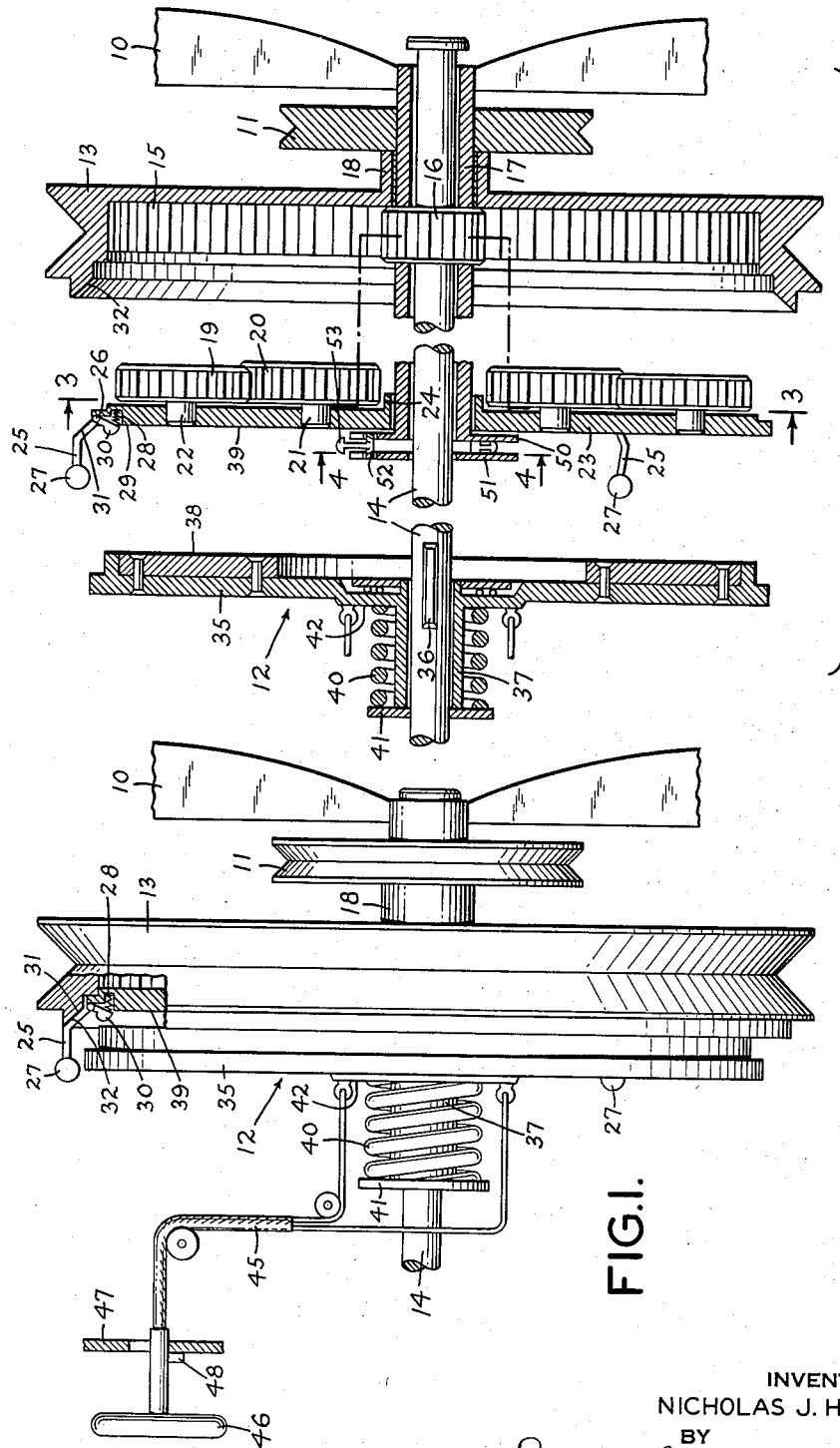

2,889,719

VARIABLE SPEED COOLING FAN FOR MOTOR VEHICLES

Nicholas J. Honich, Woodside, N.Y.

Application March 12, 1956, Serial No. 570,832

6 Claims. (Cl. 74—752)

This invention relates to devices for varying the speed of a rotating member, and it relates particularly to a speed changing mechanism for increasing and decreasing the speed of the cooling fan or water pump or both, of a motor vehicle, to maintain the temperature of the engine within desirable limits during operation of the vehicle.

Cooling systems for automotive vehicles are adequate to maintain proper engine temperatures under most operating conditions. However, when a motor vehicle is caught in a traffic jam in hot weather and idling or low speed operation of the engine is maintained over a substantial period of time, the engine of the vehicle may, and frequently does, overheat, even when the engine is in good operating condition.

Inasmuch as overheating of the engine causes great inconvenience and may actually cause damage to the engine, devices have been provided heretofore for increasing the speed of the fan and/or water pump when the engine begins to overheat. The prior devices have been too complicated, unreliable, and expensive to be accepted in the motor car industry, and such speed changing devices are not available as standard equipment or even as optional equipment for motor vehicles.

The present invention relates to an improved and simplified mechanism for increasing the rotational speed of the fan and/or water pump of the motor vehicle under the control of the operator, the mechanism being constructed and arranged so that damage to the fan, pump or engine cannot occur when the engine is operated at high speed and the speed changing mechanism is left in its high speed setting.

For a better understanding of the present invention, reference may be had to the accompanying drawings in which:

Figure 1 is a view in side elevation of the speed varying mechanism embodying the present invention with a manual control therefor shown schematically;

Figure 2 is a view in vertical cross section through the components of the speed varying mechanism in exploded relation;

Figure 3 is a view taken on line 3—3 of Figure 2;

Figure 4 is a view in section taken on line 4—4 of Figure 2; and

Figure 5 is a view in section taken on line 5—5 of Figure 4.

For purposes of description, the drawings illustrate a form of speed control or speed changing mechanism which may be used to drive the fan 10 and a pulley 11 of a motor vehicle, the pulley 11 being connected to the water pump of the vehicle (not shown). It will be understood that the speed varying mechanism may be used to drive the fan alone or the pump alone, instead of both of them, and that various systems of belts and pulleys may be used for connecting these elements to the crankshaft pulley and the generator or other accessory, as desired, and in accordance with conventional practice. A mechanism 12 for driving the fan 10 and pulley 11 includes a pulley member 13 which is driven by a suitable V-belt or the like by means of the pulley on the crank shaft of the engine in the usual way. The pulley 13 is rotatable with respect to a fixed shaft 14 that may be mounted on the engine and which also serves to support the fan and the pulley 11 rotatably.

As shown in Figures 2 and 3, the pulley 13 is provided with an internal gear 15 of a planetary gear system. Concentric with the internal gear 15 is a sun gear 16 fixed to a sleeve 17 that is rotatably mounted on the fixed shaft 14 and carries at its outer end the pulley 11 and the fan 10. A hub 18 on the pulley 13 is rotatably mounted on the sleeve 17 so that these elements can rotate relatively or together. Any suitable bearing means may be interposed between the shaft 14 and the sleeve 17 and between the sleeve 17 and the hub 18 to permit relatively frictionless rotation.

Cooperating with the internal gear 15 and the sun gear 16 are pairs of planet gears 19 and 20, the gear 20 meshing with the sun gear 16 and the planet gear 19 and the latter meshing with the internal gear 15. The pairs of planet gears 19 and 20 are rotatably mounted on spindles 21 and 22 fixed to and projecting from a supporting member 23 in the form of a generally circular plate provided with a hub 24 which is rotatably mounted on the sleeve 17.

As is usual with planet gear systems of the type described, if the support 23 is caused to rotate with the pulley 13, none of the gears 15, 19, 20 and 16 rotate relatively to each other, and the pulley 13, the sleeve 17, the pulley 11 and the fan 10 will rotate at the same speed. The plate 23 is normally caused to rotate with the pulley 13 by means of a centrifugally actuated clutch including a plurality of bellcrank levers 25 angularly spaced around the edge or rim of the plate 23 and supported by means of pivots 26 on the plate. The levers 25 have weights 27 at their outer ends and are normally biased outwardly by means of coil springs 28 received in recesses 29 in the edge of the plate and bearing against the shorter arms 30 of the levers 25. Each lever 25 has an inclined surface portion 31 for clutching engagement with a conical clutch surface 32 at the left-hand edge of the pulley 13. Thus, when the pulley 13 rotates, the centrifugal action of the weights 27 and the tension of the springs 28 will urge the clutch surfaces 31 and 32 together with sufficient force to cause the supporting plate 23 to rotate with the pulley 13, and thereby cause the fan 10 and pulley 11 to rotate at the same speed as the pulley 13. This operation will occur during normal operating speeds of the vehicle when additional cooling is not required.

Under high temperature conditions and low speed operation of the engine, it is desirable to increase the speed of the fan and/or the water pump and in accordance with the present invention, such increase in speed can be obtained with the following construction. A brake member, such as the disc-like plate 35, is mounted for movement axially of the shaft 14 and is held against rotation relative to the shaft by means of a spline 36 on the shaft engaging in a complemental groove in a sleeve or hub 37 on the brake plate 35. A brake lining or facing 38 is secured to the face of the plate 35 for cooperation with the left-hand face 39 of the supporting member 23 and is normally biased toward the planet supporting plate 23 by means of a coil spring 40 encircling the hub 37 compressed between a shoulder 41 fixed to the shaft 14 and a boss 42 on the left-hand side of the brake plate 35. The brake plate 35 is normally held out of engagement with the planet supporting plate 23 by means of a manually controlled retracting mechanism such as a solenoid coil or, as illustrated in Figure 1, a control cable 45 which is connected to an operating handle 46 extending from the instrument panel 47 of the vehicle. A detent 48 is fixed to the handle 46 for holding it in its "out" position in which the brake plate 35 is retracted. The handle 46 can be released for inward movement thereby allowing the brake plate 35 to engage the supporting plate 23 and hold it against rotation. During movement of the brake plate 35 into engagement with the brake surface 39, the arms 30 of the bellcrank levers 25 are engaged by the edge of the plate 35 and, as viewed in Figure 2, are rocked in a counter-clockwise direction to disengage the clutch surfaces 31 and 32 and release the plate 23 from the pulley 13. Disengagement of the clutch surfaces 31 and 32 is made possible by using a spring 40 having a strength exceeding the combined forces developed by the weights 27 and the springs 28 at low speeds of rotation.

When the braking surfaces 38 and 39 engage, the supporting plate 23 is held stationary and upon continued rotation of the pulley 13, speed multiplication will take place through the planet gears 19 and 20, with the result that the sun gear 16, the pulley 11, and the fan 10 are driven at greatly increased speed to cool the engine more effectively.

In order to avoid damage to the engine and the fan if the driver of the vehicle speeds up the vehicle and does not retract the brake plate 35 to decrease the fan speed; automatic means is provided for disengaging or releasing the brake and re-engaging the clutch to couple the planet supporting plate 23 and the pulley 13 together. The centrifugal mechanism is best shown in Figures 2, 4 and 5. It includes a disc-like plate 50 fixed to the left-hand end of the sleeve 17 and a cooperating pressure plate 51 which is movable axially with respect to the plate, but held in non-rotatable relation thereto by means of reversely screw-threaded shafts 52 spaced at intervals around the disc. The threaded portions 52a and 52b of the shafts engage complemental threads in the plates 50 and 51 so that rotation of the shafts in one direction will move the plates toward each other and rotation in the opposite direction will move the plates apart. Rotation of the shafts 52 to move the discs is produced by means of the weights 53 of arcuate shape on the arms 54 which are connected to the mid-portions of the shafts 52. The weights 53 are normally drawn fully in by means of springs 55 to substantially concentric positions. The pitch of the threaded portions 52a and 52b of the shafts is such that they prevent movement of the plates 50 and 51 relatively by pressure applied to them, thereby making movement of the plate 51 responsive solely to movement of the weights 53. When the sleeve 17 is rotated at a sufficiently high speed, the weights 53 will swing outwardly, and because of the greater surface thereof exposed to air, will be forced outwardly quickly by air pressure to press the plate 51 against the insert 56 in the right-hand face of the brake plate 35. The insert 56 is a bearing material, such as an oil-impregnated, porous bearing metal, nylon or the like, or a plate supported by an anti-friction bearing, so that substantial frictional heat is not developed by rubbing contact with the plate 51. The pressure exerted by the plate 51 and the greater centrifugal force developed by the weights 27, causes the brake surfaces 38 and 39 to disengage and causes the clutch surfaces 31 and 32 to engage, thereby reducing the speed of the fan 10 and pulley 11 to the same speed as the pulley 13. In this way, overspeeding of the fan and water pump is avoided. The strength of the springs 55 is such that the weights 53 will be drawn in only when the speed of the sleeve 17 is reduced to only slightly above idling speed, so that "hunting" of the brake 35 between high speed and low speed operation is eliminated.

While a manual control for engaging and disengaging the brake plate 35 has been disclosed and described herein, it will be understood that a thermostatic control may also be provided for that purpose to render the operation of the device responsive to excessive engine temperature.

Other changes in the arrangement of the planet gears to form the supporting plate and brake elements therefor may be made without departing from the invention. Accordingly, the form of the invention described herein should be considered as illustrative and not as limiting the scope of the following claims.

I claim:
1. A device for varying the relative speeds of a driving and a driven element comprising a rotatable driving element including an internal gear, a rotatable driven element including a sun gear co-axial with said internal gear, a rotatable supporting member co-axial with said drive and driven elements, at least one gear rotatably mounted on said supporting member and operatively interposed between and connecting said sun and internal gears, clutch means on said drive element and supporting member for releasably connecting them for rotation together, means urging said clutch means into light engagement, members mounted on said support for urging said clutch means into stronger engagement as the supporting member rotates, said supporting member having a braking surface thereon, a non-rotatable brake member movable toward said supporting member to engage said brake surface and retain said supporting member against rotation, said brake member having means thereon for releasing said clutch means upon movement of said brake means toward said brake, and means for moving said brake member toward said supporting member.

2. The device set forth in claim 1 comprising means interposed between said brake member and said supporting member for moving them apart when their speed of rotation exceeds a predetermined speed.

3. A device for varying the speed of a driven device relative to the speed of a driving motor, comprising a pulley, an internal gear on said pulley, a hub, a sun gear connected to said hub and co-axial with said internal gear, a supporting member co-axial with and rotatable relative to said sun and internal gears, gears rotatably mounted on said supporting member and connecting said sun and internal gears, cooperating clutch elements on said pulley and said supporting member, weighted levers pivotally mounted on said supporting member and responsive to centrifugal force for urging said clutch elements into clutching engagement and for releasably connecting said supporting member to said internal gear for rotation therewith, said supporting member having a brake surface thereon, a non-rotatable brake member biased toward said brake surface for engagement therewith to retain said supporting member against rotation, means on said brake member engageable with said levers to disengage said clutch elements during movement of said brake member into engagement with said brake surface, and means for moving said brake member out of engagement with said brake surface.

4. The device set forth in claim 3 in which the means for moving the brake member out of engagement with said brake surface comprises a manually operated member.

5. The device set forth in claim 3 in which the means for moving the brake member out of engagement with said brake surface comprises wedging means between said supporting member and said brake member, and means responsive to the speed of rotation of said sun gear for actuating said wedging means.

6. A device for varying the speed of a driven device relative to the speed of a driving motor, comprising a pulley, an internal gear on said pulley, a hub, a sun gear connected to said hub and co-axial with said internal gear, a supporting member co-axial with and rotatable relative to said sun and internal gears, gears rotatably mounted on said supporting member and connecting said sun and internal gears, cooperating clutch elements on said pulley and said supporting members, levers pivotally mounted on said supporting member and responsive to centrifugal force for urging such clutch elements into engagement to releasably connect said supporting member to said internal gear for rotation therewith, said supporting member having a brake surface thereon, a non-rotatable brake member biased toward said brake surface for engagement therewith to retain said supporting member against rotation, means on said brake member engageable with said levers to disengage said clutch elements during movement of said brake member into engagement with said brake surface, a pair of relatively movable plates interposed between said brake member and supporting member and rotatable with said sun gear, weight elements movably mounted on said plates for swinging movement in response to variation in the speed of rotation of said sun gear, and wedging means responsive to swinging movement of said weight elements for moving said brake element out of engagement with the brake surface, when the speed of rotation of the sun gear exceeds a predetermined value.

References Cited in the file of this patent

UNITED STATES PATENTS

| | | |
|---|---|---|
| 992,308 | Weis | May 16, 1911 |
| 1,685,523 | Dodge | Sept. 25, 1928 |
| 2,009,914 | Brown | July 30, 1935 |
| 2,087,261 | Miller | July 20, 1937 |
| 2,771,792 | Whitney | Nov. 27, 1956 |